(12) United States Patent
Abel et al.

(10) Patent No.: US 7,561,159 B2
(45) Date of Patent: Jul. 14, 2009

(54) CONTROL OF ANIMATION TIMELINE

(75) Inventors: Glenn Abel, La Jolla, CA (US); Ricardo Cook, Chula Vista, CA (US); Andrew J. Wolpe, La Jolla, CA (US)

(73) Assignee: Magnifi Group Inc., San Diego, CA (US)

( * ) Notice: Subject to any disclaimer, the term of this patent is extended or adjusted under 35 U.S.C. 154(b) by 0 days.

(21) Appl. No.: 11/316,092

(22) Filed: Dec. 21, 2005

(65) Prior Publication Data

US 2007/0139418 A1    Jun. 21, 2007

Related U.S. Application Data

(60) Provisional application No. 60/686,086, filed on May 31, 2005.

(51) Int. Cl.
*G06T 13/00*   (2006.01)

(52) U.S. Cl. ........................................ 345/473

(58) Field of Classification Search .................. None
See application file for complete search history.

(56) References Cited

U.S. PATENT DOCUMENTS

| | | | |
|---|---|---|---|
| 6,011,562 A * | 1/2000 | Gagne et al. | 345/473 |
| 6,714,201 B1 * | 3/2004 | Grinstein et al. | 345/474 |
| 7,173,623 B2 * | 2/2007 | Calkins et al. | 345/473 |
| 7,336,280 B2 * | 2/2008 | Nelson et al. | 345/473 |
| 2005/0140694 A1 * | 6/2005 | Subramanian et al. | 345/619 |
| 2006/0022983 A1 * | 2/2006 | Gauthier et al. | 345/473 |

* cited by examiner

*Primary Examiner*—Xiao M Wu
*Assistant Examiner*—Said Broome
(74) *Attorney, Agent, or Firm*—Alton W. Payne

(57) ABSTRACT

A method for controlling an animation timeline comprising the steps of determining the three-dimensional assets of the data in the animation timeline and, if required, converting the data dimensionally, cleaning up the data in the animation timeline, building a mesh for the data in the animation timeline, setting up a scene for the data in the animation timeline, animating the scene for the data for creating animated data, publishing the three-dimensional content of the scenes for the data in the animation timeline, creating an appropriate interface for the data in the animation timeline, synchronizing a soundtrack to the animated data, incorporating additional features to the animated data, and combining the animated data such that the data is mixed, HTML prepared and Java script adapted whereby the method provides a self-contained object.

11 Claims, 12 Drawing Sheets

MAG10 Library Object

1. VMP animation reference

2. Set of animation sequences

3. Name of camera animation

4. Set of steps (name and start time)

...

1. Play animation

2. Pause animation

3. Resume animation

4. Go to step (stepNum)

5. Add animation (aName)

6. Camera animation (cName)

7. Add step (sName, sStart)

```
1    <MTSTimeElem Type="Keyframe" Name="Obj01">
2      <Target Name="MTSInstance.obj01" Property="loc_" Timeline="loc_ obj01"/>
3      <Time>
4          0 10 12.5 14 16.8 19 25 32 40.5 65
5      </Time>
6      <Timeline Name="loc_s2_obj01a" Type="3D">
7          * [-6.678 -6.609 -18.003] [1 1 2] [4 6 3.5] [-1 2 56] [1 4 56] [1 3 4]
8          [0.2 -6 1] [1 1 1]
9      </Timeline>
10   </MTSTimeElem>
```

FIG. 15

```
1    vmp = new MTSPlugin("test.mtx", "100%", "77%", "BroadcastKey.mtx", "classic", "ContentType=1");
2    mag10 = new mag10Library(vmp);
3
4    mag10.addAnimation('obj01_loc');
5    mag10.addAnimation('obj02_rot');
6    mag10.addAnimation('obj03_loc');
7
8    mag10.camAnimation('Camera_camAnim');
9
10   mag10.addStep('Step 1',0);
11   mag10.addStep('Step 2',10);
12   mag10.addStep('Step 3',24);
13   mag10.addStep('Step 4',37);
```

FIG. 16

```
1    <MTSTimeElem Name="StepOne" On="0">
2
3      <MTSTimeElem Type="Keyframe" Name="StepOne_Obj01">
4        <Target Name="MTSInstance.obj01" Property="loc_" Timeline="loc_s1_obj01"/>
5        <Target Name="MTSInstance.obj01" Property="opac" Timeline="opac_s1_obj01"/>
6        <Time>
7            0 0.01
8        </Time>
9        <Timeline Name="loc_s1_obj01" Type="3D">
10           * [-6.678 -6.609 -18.003]
11       </Timeline>
12       <Timeline Name="opac_s1_obj01" Type="1D">
13           [0] [0.5]
14       </Timeline>
15     </MTSTimeElem>
16           .
17           .
18           .
19
20   </MTSTimeElem>
```

FIG. 17

```
1   <MTSTimeElem Name="StepTwo" On="0">
2
3     <MTSTimeElem Type="Keyframe" Name="StepTwo_Obj01">
4       <Target Name="MTSInstance.obj01" Property="loc_" Timeline="loc_s2_obj01"/>
5       <Target Name="MTSInstance.obj01" Property="visb" Timeline="visb_s2_obj01"/>
6       <Time>
7          0 0.01
8       </Time>
9       <Timeline Name="loc_s2_obj01" Type="3D">
10         * [-6.678 -6.609 -18.003]
11      </Timeline>
12      <Timeline Name="visb_s2_obj01" Type="Int">
13         [0] [1]
14      </Timeline>
15    </MTSTimeElem>
16                  .
17                  .
18                  .
19                  .
20  </MTSTimeElem>
```

FIG. 18

```
1   <MTSTimeElem Type="Keyframe" Name="StepTwo_Obj01a">
2     <Target Name="MTSInstance.obj01" Property="loc_" Timeline="loc_s2_obj01a"/>
3     <Time>
4        0 10 12.5 14 16.8 19
5     </Time>
6     <Timeline Name="loc_s2_obj01a" Type="3D">
7        * [-6.678 -6.609 -18.003] [1 1 2] [4 6 3.5] [-1 2 56] [1 4 56]
8     </Timeline>
9   </MTSTimeElem>
```

FIG. 19

CONTROL OF ANIMATION TIMELINE

CROSS REFERENCE TO RELATED APPLICATION

The present application is a continuing application of provisional application 60/686,086 of Glenn Abel and Ricardo Cook, filed May 31, 2005.

FIELD OF THE INVENTION

The present invention relates generally to the control of an animation timeline in association with a media player and the manipulation of a 3D animation's timeline. More particularly, the present invention relates to an external object library to control an animation timeline such that the interactivity by the user on the animation is enhanced so as to provide better control of the animation by the user. The present invention relates specifically to the Viewpoint Media Player (VMP) and enhancing the user interactivity from the original scope intended by Viewpoint.

BACKGROUND

The evolution of Web content has evolved from pure text content, to images (static and animated), audio and video. For the most part, multimedia has been a great addition to any website, as it provides an option for richer content and visual design. Although the Web provides support for audio and video (i.e., movies, streaming real-time feedback or animation), it doesn't necessarily represent the best medium to replicate these formats compared to other platforms, such as a CD or DVD player. The reason the Web has problems supporting audio and video is that the file size of the multimedia components requires a great amount of time to download or stream. By publishing files for a complete download, the viewer needs to wait for the file to download in its entirety before it displays. The other method, streaming, allows the contents to display and play when the first segment is made available, while in the background the rest of the file is being downloaded. Even with these methods for large file size video, many considerations need to be taken into account when including video files on a Web site.

Animations, both in 2D and 3D, are considered to be a type of video. Any 2D animation file size is considerably small when compared to a 3D animation file. The difference in the magnitude of the file sizes is due to additional features that can be, and typically are, included as part of a 3D animation: effects (shadows, reflections, waves, etc), surfaces, textures, etc. Because of its visual benefits, 3D animation has been an asset for almost any market that requires demonstrating a product, procedure, location, or any other element of interest. In most cases, an animation is enough to provide the necessary information but in product procedures, specifically detailed-oriented procedures, such as for example, a medical device. There are two characteristics which do not make this type of animation the best solution for detail-oriented procedures: file size and lack of interactivity. The files are large and the lack of interactivity is restrictive.

In a traditional 3D animation the file size is inherent to the format. There are no solutions to work around this issue. The problem doesn't arise when the animation is distributed through CD, DVD or even viewed locally from the end-user's computer. As animations become part of a company's marketing or training solution, internet distribution is inevitable; and this is when file size becomes a problematic issue.

In addition, traditional 3D animation provides a pre-set camera angle, giving the viewer no other choice but to see the artist's interpretation of the procedure. When animations are detail-oriented, it is important for the viewer to be able to manipulate and interact with the animation. By giving complete control to the user, an animation would be more appreciated and useful if it was accessible from different angles, positions and distances.

Moving from traditional 3D animations to a format that addresses both of these issues, file size and interactivity, is the main reason that MAG[10] technology is being implemented on animations designed for the Viewpoint Media Player (VMP). The file size is reduced drastically, so internet distribution is reasonable, and the user is able to interact with the animation. Unfortunately, as with any solution, there will always be new challenges to overcome. In their native format, all animations designed for the VMP have limited functionality. Basic interactivity can be added, such as for example a way for the user to stop, play or restart the animation. Ideally, for detail-oriented procedures, there should be a method for the user to be able to go to a certain point in the procedure (without viewing the entire animation), and to access the sound, or pause the procedure or continue the procedure. MAG[10] technology provides a solution to implementing mid-point procedure effects.

The Internet and the World Wide Web are rapidly expanding, with businesses and individuals using their own Web pages. This has created a demand for richer Web page capabilities especially in the area of coordinated presentations and control of multimedia events, including being able to easily synchronize the execution of a plurality of multimedia events over a period of time (i.e., playing a multimedia timeline). Because not all Web page owners are sophisticated computer users, the design and programming of Web pages must remain simple. Nor should synchronizing the execution of multimedia events to a timeline defined within in a Web page require complicated or lengthy user programs. Instead implementing and controlling a Web page should be intuitive (i.e., "user-friendly"), while still providing sophisticated capabilities, such as starting and stopping animations during a sequence, shifting between sequences and defining a window for execution of a time critical event or sequence.

Web pages are composed of various multimedia elements, controls, and applets as defined by the Hypertext Markup Language (HTML) for a given Web page. Multimedia can be characterized as some combination of visual media, audio media and time. Multimedia is an open environment, with timing being the common thread across all multimedia events. Multimedia experiences, such as the movement of physical models, graphics and the playing of sound, require coordinated execution of these events. For instance, the playing of a sound bite of a door slamming should be coordinated with the animation of the door closing so the sound is heard upon the visual closing of the door, and not before or after the door closes. Even more importantly, being able to control the opening of the door, the door reaching its maximum open position and the door closing to cause the slamming sound and the abrupt stop of the movement of the door.

Providing synchronized multimedia experiences is complicated because timing control information is not inherent in the content of an HTML document. Past attempts at providing such synchronization and timing control of activities within a Web page have basically take on one of several forms, such as for example, (1) external programs and (2) lengthy, complicated scripts or programs. These solutions generally are non-user-friendly, require additional hardware resources, software resources and/or expenses, and do not provide true synchronization of multiple events to a single timeline. Additionally, other approaches have not allowed synchronization between application-specific components (e.g., graphics and audio) and host-intrinsic components (e.g., HTML elements).

External multimedia control programs, such as Director, by Macromedia, can be expensive, and do not allow the direct creation and modification of a multimedia timeline by editing the HTML code. Rather, any changes and additions to the multimedia timeline must be made using the external program itself. Furthermore, the timing mechanism of some of these external programs are based on "frames" of time rather than directly on a time scale. A frame corresponds to a duration of time during which a set of defined activities are to be performed. Frames provide a method to sequentially perform sets of activities where there is some timing relationship based on frame rates and the time required for the sets of activities within the frame to be performed. However, individual events are not specified to be executed at a particular time (e.g., at time t=10.000 seconds), rather to execute within a frame (e.g., in frame 2) which does not provide an intuitive indication of the exact time for executing the event.

Another approach has been to write lengthy code or scripts within a control loop of the computer program which evaluates the incremental time of each pass through the control loop. In which case, the control loop can tie up an entire processing thread which interferes with applications or processes, and at a minimum requires extra computer cycles. Every time the control loop is executed, a large number of statements must be evaluated to determine whether to execute the actual events. This approach is less than desirable, especially as the number of events to control the process increases. In such a case, the process becomes long and complicated, and often more complex than a typical Web author knows how to create by hand. Also, such a control loop requires a large amount of processing time to determine whether to execute an event, which is disadvantageous especially in the multimedia context where events must be synchronized to a timeline having a granularity on the order of milliseconds. Furthermore, to guarantee a desired performance, the number of events controlled by a control loop must remain small because the control loop must iterate at a rate at least as great as the fastest timing requirement. Moreover, in many implementations such as those using an HTML document, the code within the control loop is written as an interpreted script thus compounding its evaluation time in comparison with that which is implemented using a built-in service or compiled code. Therefore, as the number of events to control becomes large, the timing performance correspondingly degrades and the granularity to which events can be set to perform becomes coarser. Moreover, the timing performance varies significantly and unpredictably depending on the power, performance, and current operating load of the computer on which these scripts or sets of code are run.

A variant of this approach uses a software timer control to generate a control event on a regular basis and causing a control program to execute the process. The control program then evaluates the current time and initiates the execution of the desired multimedia event. For instance, on a Web page, the setTimeout command can be used. This HTML code variant is more desirable than that of a control loop as it decreases the amount of evaluation code required. However, using this approach, it is cumbersome at best to stop the execution of sets of active timelines, and, more importantly, there is no synchronization of two events to a single timeline. Instead, these events are independently scheduled when their respective setTimeout command is interpreted and therefore, they are not synchronized. Furthermore, when multiple events are scheduled to begin execution at the same instant of time, the order in which the events will be executed is undefined for the setTimeout command which means a Web page does not necessarily produce the same results every time it is run, either on the same or on a different computer platform. Not producing the same results on every run is a common problem in other timing control approaches as well. Furthermore, such approach have disadvantageous performance limitations because the scripts become long and complex, and the timing performance is unpredictably sensitive to the performance of the machine on which these set of code or scripts are executed.

In addition to their performance limitations, the prior approaches are directed towards basic timing control. In other words, these approaches only provide a way of initiating the execution of an activity at some defined point in the future, which is only a subset of the identified need in the computer industry for controlling multimedia experiences and applications. Lacking from these prior approaches are robust capabilities for providing true prioritization among events, the adaptation of events along the timeline, and the ability to alternate between events having different timelines.

In non-Web environments, schedulers have been provided to be able to start a process at a specified future time, e.g., a UNIX "chron" job. However, these schedulers do not provide the capabilities required for synchronizing a plurality of multimedia events along a timeline or for switching between multimedia events. For instance, the timing granularity of such schedulers is usually on the order of seconds, with no exact guaranteed starting time. Moreover, these schedulers do not accommodate single or multiple timelines with an accuracy of milliseconds for initiating actions as required for the accurate presentation of multimedia experiences. Moreover, such schedulers do not provide enhanced features for controlling the invocation of events.

Generally, animations created for a media player, such as, for example, the Viewpoint Media Player (VMP) have a limited functionality. Having limited functionality means resetting the animation, playing an animation through its entire course, lack of control, etc. Although media players such as Viewpoint Technology (VET) provide a rudimentary process to accomplish similar functionality, the lack of functionality has proven to be a drawback in an applicable project's development cycle.

A main drawback is during the initial development. Such a project requires more time in order to break down the animation. Media players assign one animation sequence per object. Thus, if there were ten objects (e.g., with respect to a medical animation the hands, tissue, instruments, etc.), there would be ten animation sequences. Each one of these sequences needs to be broken down into the number of steps required. In addition, if any maintenance was required by a project, then one would have to go back and re-create the sub-animations.

For example, Viewpoint's approach is to provide a step-by-step feature. The step-by-step feature is to break an animation into segments, each segment corresponding to a step. The purpose of these segments is to contain all the information required for a step, such as by way of example, an initial properties setup for all the objects. The objects are, by way of example and without limitation, position, size, opacity, visibility, and the like. Also, a series of animators for the objects will be used in the step.

Viewpoint Technology (VET) has provided a rudimentary process to accomplish a similar functionality as provided by the present invention, however, it has proven to be a drawback in a project's development cycle. Viewpoint's approach to provide a step-by-step feature is to break an animation into segments, each segment corresponding to a step. The purpose of these segments is to contain all the information required for a step:

(a) An initial properties setup for all the objects: position, size, opacity, visibility, etc.
(b) A series of animators for the objects that will be used in the step.

FIG. 1 illustrates an overview of Viewpoint's approach to provide a step-by-step feature. First, the animation needs to be created by using a 3D authoring tool, such as by way of example, LightWave, Maya or 3D Max. Creating an animation by using a 3D authoring tool in a project is a standard technique, regardless of the final output format. The layout of the animation at this stage is a continuous timeline. Being a continuous timeline means that it has one starting and one ending point. The continuous timeline starts at zero and ends at the animation's length, (i.e., thirty seconds, five minutes, twelve minutes or one hour twenty minutes).

Using this layout, a breakdown needs to be done in order to produce the step-by-step version. The steps and their corresponding layouts for each step are identified. The layouts include information regarding each of the object's properties, such as, position, size, opacity, visibility, texture. Not all properties are required to be specified, only those appropriate for a specific step. In general, the position setup is always present, this is because objects (instrumentation, anatomical sections, etc.) change location throughout each step of the procedure, and by playing a particular step, an object's initial position for that step needs to be specified.

FIG. 2 illustrates an XML layout for a Viewpoint development in a four step project. The four step animation illustrated in FIG. 2 contains four different objects. Each step has its own set of animation segments, either for an object's initial setup or animation segment. Step 1 shows four positioning segments for objects 1-4, and one animation for object 1. Not all properties nor all objects are necessarily included as part of a step, as shown in step 2, where only object 1 and object 2 are affected; and object 3 and 4 are not. In addition, an object can have several animation segments: object 1 has two, in step 1 and step 2; object 3 also has two, in step 3 and in step 4.

Although the Viewpoint process provides a way to enable the step-by-step feature on animations, such a process is not an optimal solution. The impact the Viewpoint process has is not in the user's perspective, but in the development cycle for all projects. FIG. 2 only shows a simple example of a project, but it demonstrates that as complexity increases, the number of animation segments will increase dramatically.

The creation of each animation segment is done within a 3D authoring tool, and the time interval for a step needs to be identified and the start position and the end position for all tools and the animation sequences for the required objects are defined. Each step sequence has its own timeline, starting at zero and ending at the step's length. Once exported to the VET format, these sequences translate into XML code, creating code segments similar to the ones shown in FIGS. 17, 18 and 19. Where FIG. 17 illustrates code for an initial setup configuration for one object for step one; and FIG. 18 illustrates code for an initial setup configuration for one object for step two; and FIG. 19 illustrates animation code for one object during a particular step.

More particularly, FIG. 17 illustrates a section of XML code corresponding to object obj01 in step one. Its purpose is to assign an initial position and opacity to the object. Lines 4 and 5 are referencing the corresponding properties: "loc_" (location/position) and "opac" (opacity). The fact that the timeline, line 7, goes from 0 to 0.01 (it has a duration of $\frac{1}{100}$ seconds), indicates that the object's properties are being initiated, since that interval is too short for anything to be visualized.

FIG. 18 is similar code to that illustrated in FIG. 17. For the code illustrated in FIG. 18 the object obj01 is being initiated (timeline runs from 0 to 0.01) with its position and visibility properties, but for step two.

FIG. 19 corresponds to code for an animation segment of object obj01 for step two. In the situation illustrated in FIG. 19, the animation is changing the values for the position property of the object. The associated transition occurs during the interval from 0 to 19 seconds (line 4). If several properties need to be modified during this interval, additional property targets need to be declared. These will be similar to the one at line 2; a segment block for that particular property will also need to be added (lines 6-8).

Potentially, a very complex project can have one setup segment for each object for each step. In addition, it will also have an animation segment for each object, for each step. This would create a series of code similar to the ones in FIGS. 17 and 18. As a consequence, the XML code is more extensive, creating larger files.

In Viewpoint's process as well as the known prior art, there is one animation sequence per object per step. The one animation sequence per object per step is for those objects which need to be animated and for initial placement in a step as illustrated in FIG. 2. The MAG$^{10}$ object of the present invention only requires one animation sequence per object.

It is, therefore, a feature of the present invention is to allow viewers to jump to a specific point of the animation, in either direction. The development of an external object library (MAG$^{10}$ object) to control an animation's timeline is disclosed. The present invention works in conjunction with animations created for media players generally, and specifically for the Viewpoint Media Player (VMP). The present invention provides an innovative set of features to enhance the user's interactivity with an animation. The primary function of the MAG$^{10}$ object is to allow viewers to jump to a specific point of the animation, in either direction.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY

To achieve the foregoing objects, features, and advantages and in accordance with the purpose of the invention as embodied and broadly described herein, an external object library to control an animation timeline such that the interactivity by the user on the animation is enhanced so as to provide better control of the animation by the user is provided.

The present invention addresses the lack of additional user interactivity on animations designed for the VMP, this includes:

(1) a method to go to a certain point in the animation representing a specific stage of a procedure;
(2) a method to include sound as part of the animation; and
(3) a method to manipulate the timeline of the animation, by providing a pause, continue and other time controls.

These methods have been addressed with the implementation of an external object library (herein referred to as MAG$^{10}$ object) to control an animation's timeline. The technology works in conjunction with animations created for the VMP, providing an innovative set of methods for providing features to enhance the user's interactivity with an animation. The primary function of the MAG[10] invention is to allow viewers to jump to a specific point of the animation, in either direction. And, because of the technology-driven nature of this solution, new features can be and are continuously being added.

Prior animations created for the VMP have a limited functionality, such as by way of example and without limitation, resetting the animation, playing an animation through its entire course, etc. In order to provide the user with additional options to manipulate the animation's timeline and to make the development phase for an animation project more timely and efficient, a library had to be designed and developed. Even though the initial goal was to provide a solution for timeline manipulation, it was clear that this solution had to be scalable and reusable; otherwise, it wouldn't be an efficient solution from the development stand point.

The present invention has been developed to provide a consistent, efficient and straight-forward method of accomplishing the features aforementioned. The importance of the present invention being scalable and reusable is of significance when multiple projects are being developed. A given project may have different requirements and the MAG[10] library can be and may be upgraded with additional features to meet a robust range of requirements.

A method for controlling an animation timeline comprising the steps of determining the three-dimensional assets of the data in the animation timeline and, if required, converting the data dimensionally, cleaning up the data in the animation timeline, building a mesh for the data in the animation timeline, setting up a scene for the data in the animation timeline, animating the scene for the data for creating animated data, publishing the three-dimensional content of the scenes for the data in the animation timeline, creating an appropriate interface for the data in the animation timeline, synchronizing a soundtrack to the animated data, incorporating additional features to the animated data, and combining the animated data such that the data is mixed, HTML prepared and Java script adapted whereby the method provides a self-contained object.

By using the MAG[10] library object of the present invention, as opposed to any alternate process, a project includes additional features which enhance the user experience by increasing the level of interactivity and control.

As with any software development, it is imperative that the library, class, function or procedures are reusable, scalable and efficient. The MAG[10] library object of the present invention complies with these requirements. The same library has been used in several projects to provide the same functionality without the need to change existing code. It is appreciated by those skilled in the art that the library can be upgraded to include those new features as part of a project. The use of the library of the present invention has decreased the overall time for project development.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

FIG. 14 is a chart illustrating a plurality of MAG[10] Library Object Class descriptions as encompassed by the present invention.

FIG. 15 illustrates keyframe code for an object during an animation as practiced by the present invention.

FIG. 16 illustrates MAG[10] code embedded onto HTML code as practiced by the present invention.

FIG. 17 illustrates code for an initial setup configuration for one object for step one.

FIG. 18 illustrates code for an initial setup configuration for one object for step two.

FIG. 19 illustrates animation code for one object during a particular step.

Figure 1:
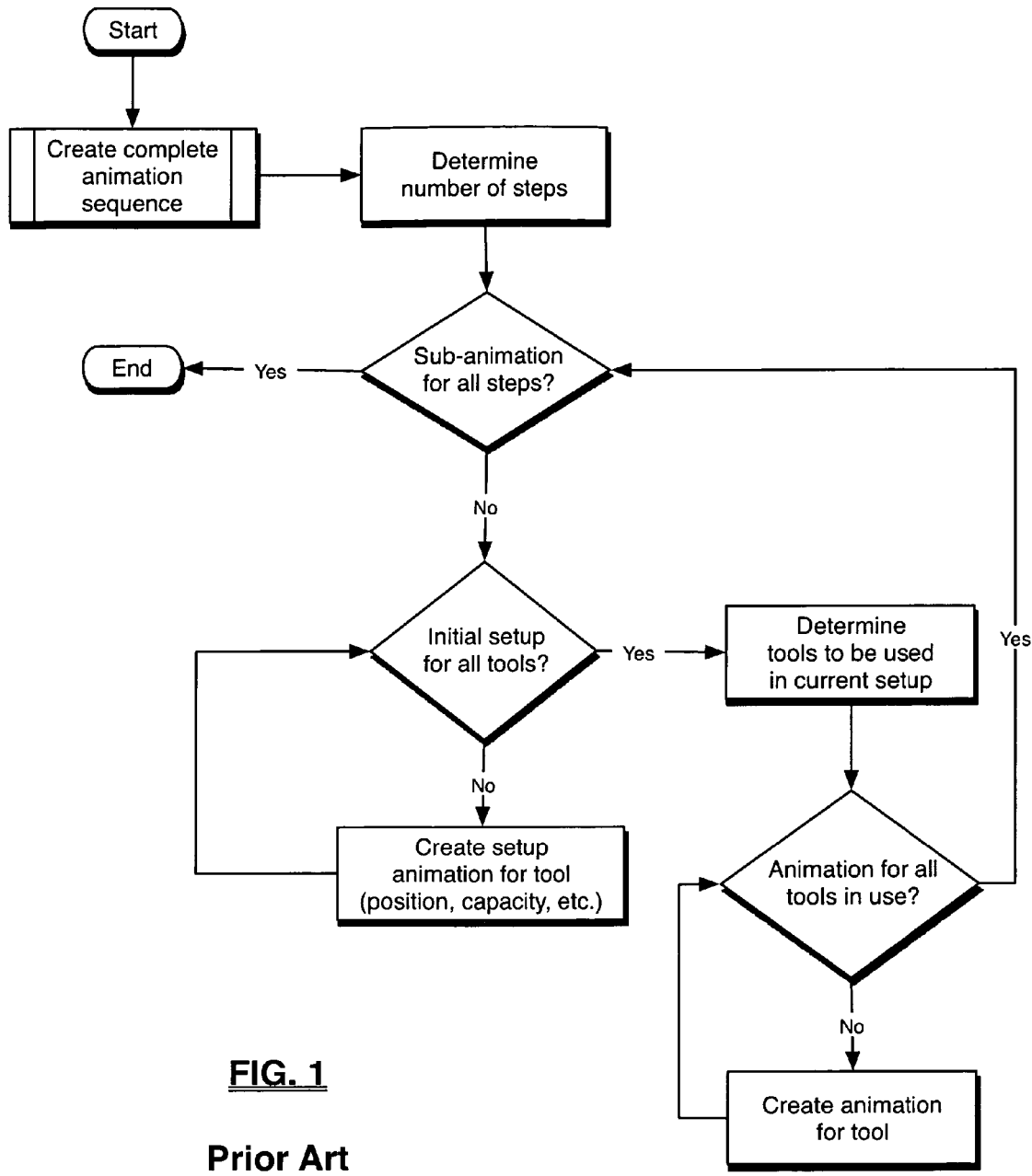
FIG. 1 is a flowchart illustrating an overview of Viewpoint's prior art approach to provide a step-by-step feature.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

General Description

The MAG[10] library of the present invention is an additional layer of code, developed under JavaScript, that provides communication between the Graphical User Interface (GUI) (See, FIG. 8) and the VMP content. The focus and heart of the MAG[10] library is the keyframes or animation sequences. A keyframe contains the following information:
(a) A timeline: a set of time frames where a value is changed on the specified property,
(b) A target: the object which is going to be affected,
(c) A property: the object's attribute which is going to be affected (location, rotation, opacity, visibility, texture, size), and
(d) A set of values: each value corresponds to one time frame in the timeline.

Having these characteristics, the MAG[10] library has all the information required to manipulate the timeline of the animation. It also stores all the necessary data to provide the step-by-step functionality: number of steps, animation sequence names, camera animations and starting time for each step (See, FIG. 9). A simple and generic section of code is described in FIG. 16. The information sent to the MAG[10] library object (See, FIG. 14) is the following:
(a) Reference to the VMP animation that is going to be handled by the MAG[10] library object (line 2).
(b) Name of animation sequence. In this example there are three animation sequences: obj01_loc, obj02_rot, obj03_loc (lines 4, 5 and 6).
(c) Name of the camera animation sequence in line 8. Even though the camera animation is actually an animation sequence as any other, the MAG[10] library object handles this instance different, as it only executes the camera animation sequence when certain options are enabled.
(d) Step information. There are four steps in this example (lines 10-13). The setup function has the following syntax: mag[10].addStep(stepName,stepStart);
The first parameter, stepName, is an identifier given to that particular step. The second parameter, stepStart, indicates the time, in seconds, when the step starts within the entire animation time sequence.

As shown in FIG. 3 and FIGS. 4, 5, 6 and 7, once the 3D assets have been edited and published as a VMP content, the files are used as exported. The export takes place using Deep Exploration by Right Hemisphere, the output of this export is two files: a MTS file and a MTX file. The MTS file is a binary file which contains all the information for the geometry of all objects in the scene. The MTX file is an XML file which contains the positioning of all objects, global parameters (shadow, rendering mode, camera settings, etc.), keyframe information or animation sequence (See, FIG. 15 for an example of relevant code), and links to external files (images, flash or sound). The MTX file is text based and can be edited to incorporate some features into the animation.

Figure 9:
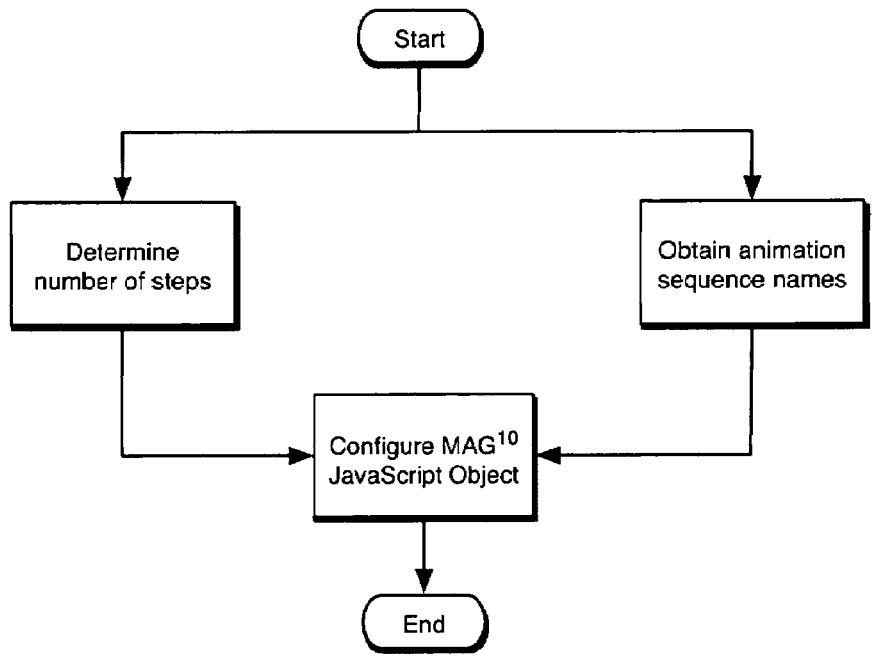
FIG. 9 is a flowchart illustrating a high-level workflow of the initial setup encompassed by a MAG[10] project of the present invention.

By using the MTX file directly as it has been exported, it greatly simplifies the project development process, as the only additional activity at the end of the animation's development is to determine the time where each step begins and ends, as well as all the names of the animation sequences for each object (See, FIGS. 9 and 16). The key benefit is the number of animation sequences that are generated. Because the MAG[10] object manipulates the timeline, it doesn't require more than one animation sequence for each object, since this would actually contain all the information for the entire animation (See, FIG. 13). With this information the MAG[10] object can determine a specific stage in a procedure or a different time in the animation by going to the corresponding time in seconds, for example, of that object's animation sequence. The XML code does not contain any indication of when a step starts or ends, it only has the information as one sequence, the time and the appropriate value for a property (See, FIG. 15).

In addition to simplifying the development process, the present invention also reduces the amount of code generated. FIG. 15 shows the code for the animation sequence of one object. Line 4 indicates the timeline, which has a length of 65 seconds, which can contain the information of several steps.

MAG[10] Communication

Figure 10:
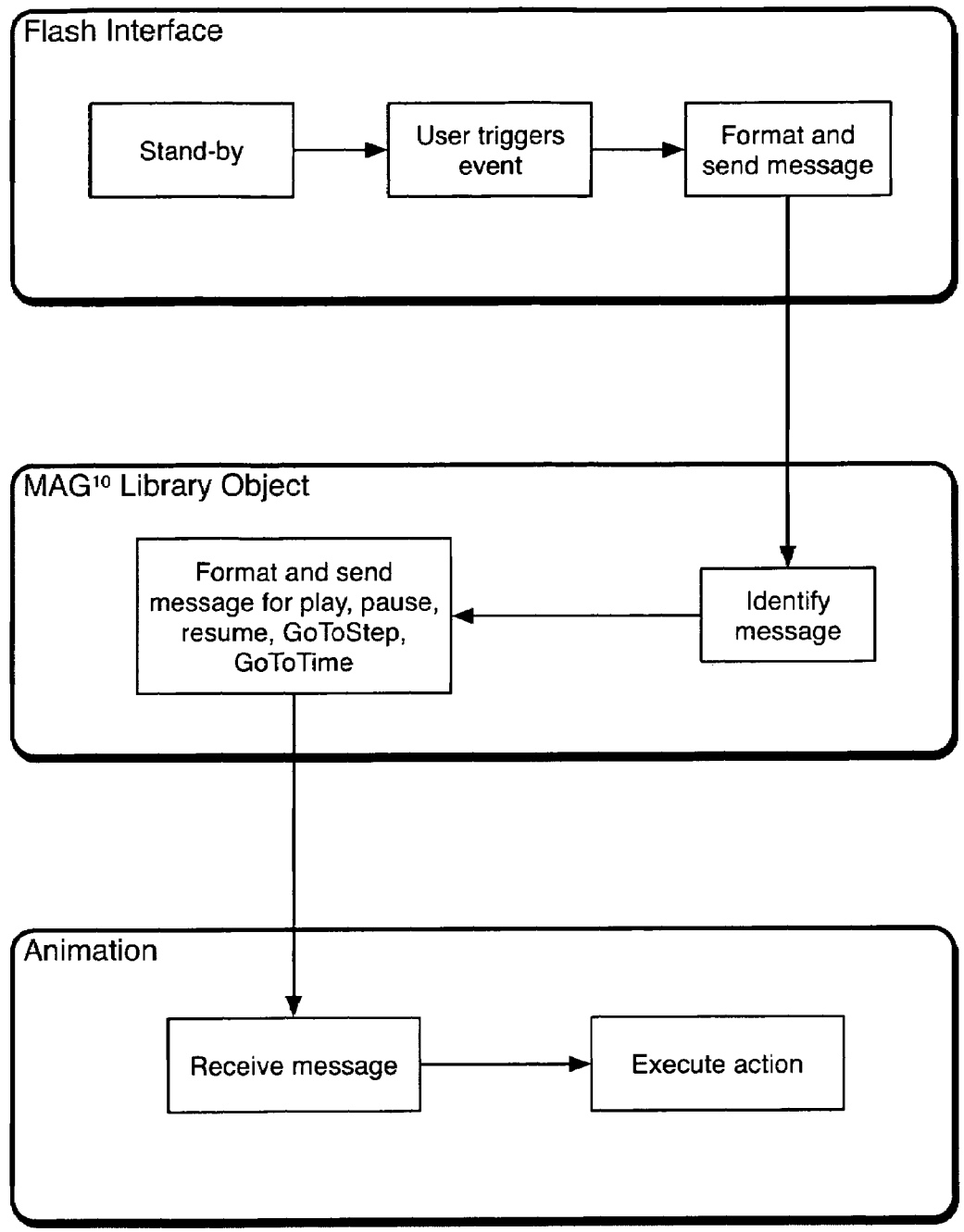
FIG. 10 is a flowchart illustrating a Flash Interface, a MAG[10] library object and a VMP communication encompassed by the present invention.

The MAG[10] library object acts as a medium for establishing communication between the GUI and the VMP content. The GUI contains a widget (button, checkbox, scroll bar, link) to give the user control over each command that is made available on every animation, such as by way of example, autorun mode, pause/resume, loop, mute, go to a specific step. Once an event is triggered, when the user interacts with the interface, a command message is sent to the MAG[10] library object. This command is identified, processed and the appropriate action takes place by relaying a message and manipulating the VMP animation. This process is depicted in FIG. 10 which illustrates a Flash Interface, a MAG[10] library object and a VMP communication encompassed by the present invention. When a message is sent from the MAG[10] library object to the VMP animation, it is usually sent as a series of messages, one for each animation sequence. Following is a brief description of the messages sent for each action:
(a) Play: Each message targets one animation sequence, the message contains the animation sequence's name and an initial time for it to play from, which is zero.
(b) Pause: Each message targets one animation sequence, the message contains the animation sequence's name and command to stop. This action will completely stop all the animation sequences and it mimics a pause by storing the time to resume in the GUI.
(c) Resume: Each message targets one animation sequence, the message contains the animation sequence's name and a starting time for that animation. This time has been previously stored in the GUI. By sending a specific time command to each animation sequence, it visually represents as if the animation is just continuing from when it was paused; but in reality, each animation is being reset to that particular time.
(d) Go To Step: Each message targets one animation sequence, the message contains the animation sequence's name and a starting time for that animation. The starting time for an animation is determined by the step start time preset on the MAG[10] library object.

Discussion of Figures

FIG. 1 is a flowchart illustrating an overview of Viewpoint's prior art approach to provide a step-by-step feature. This flowchart represents the process to accomplish a step-by-step animation using Viewpoint's standard development. The step of creating complete animation sequence includes modeling and animating as explained for FIGS. 3, 4, 5, 6 and 7; but does not include the exporting task as explained herein. The step of determining the number of steps must be implemented. Before continuing to export the animation into ViewPoint's format, it is necessary to break-down the animation into the number of steps of the procedure. Further, sub-animations must be provided for. There are two types of sub-animations generated: a setup sequence and one for the actual movement during the step. A setup sequence is executed immediately when a step is played, the purpose of these sequences is to relocate all the objects in the scene to their corresponding position for that particular step.

The initial setup for all tools should be complete. If not, it is required to create a setup animation for the tool. A setup sequence is created for a particular tool. The setup sequence could include position, transparency, scale, etc. Then, the tools to be used in the current step must be determined. Not all tools are animated during all steps. For each particular step, the tools that are being animated need to be identified and an animation sequence for those tools needs to be created. A determination needs to be made of whether the animation for all tools in use is complete. If not, an animation must be created for the tool. Thereafter, the overall animation for a tool is created.

Figure 2:
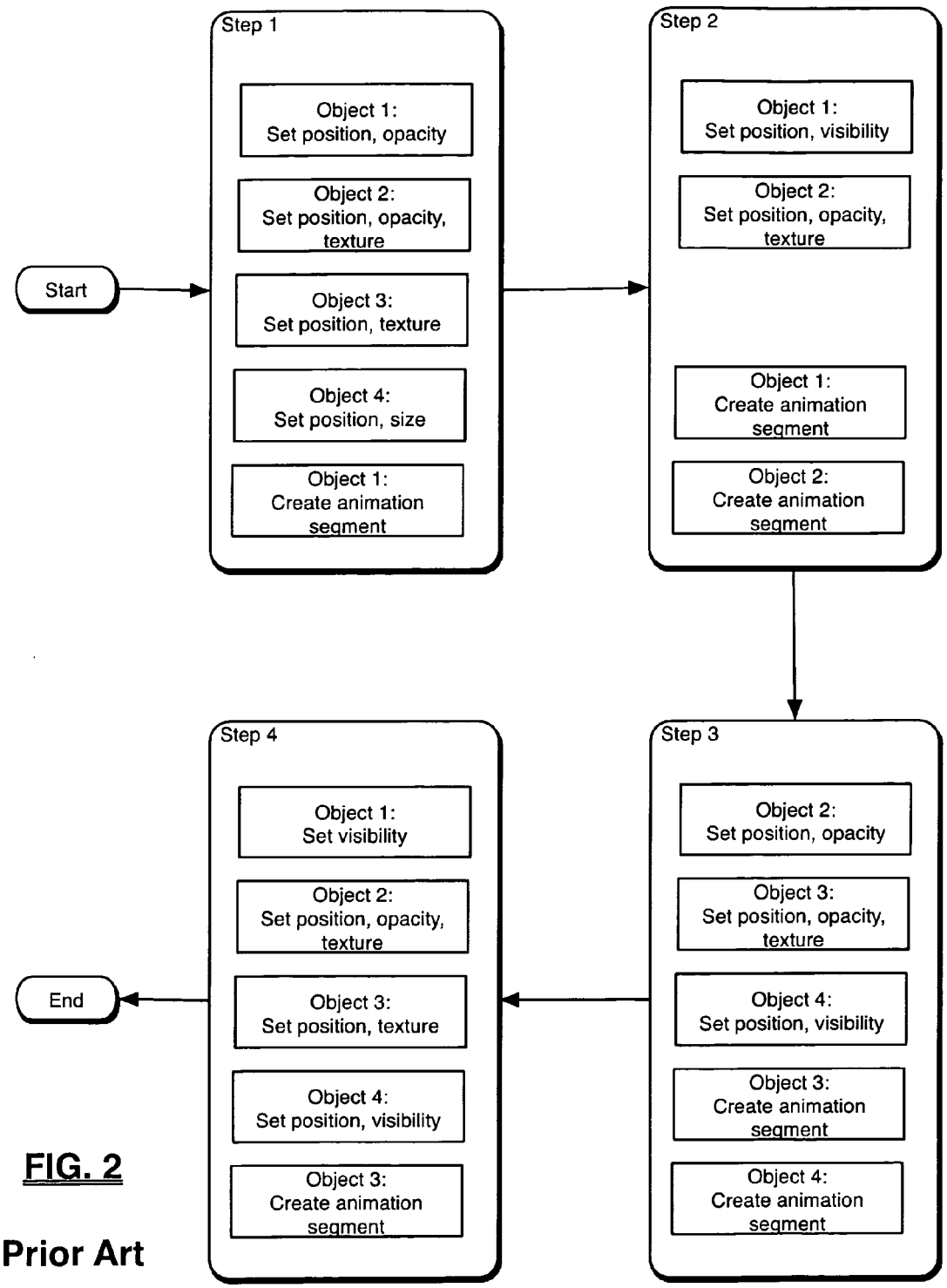
FIG. 2 is a flowchart illustrating an XML layout for a prior art Viewpoint development in a four step project.
Figure 13:
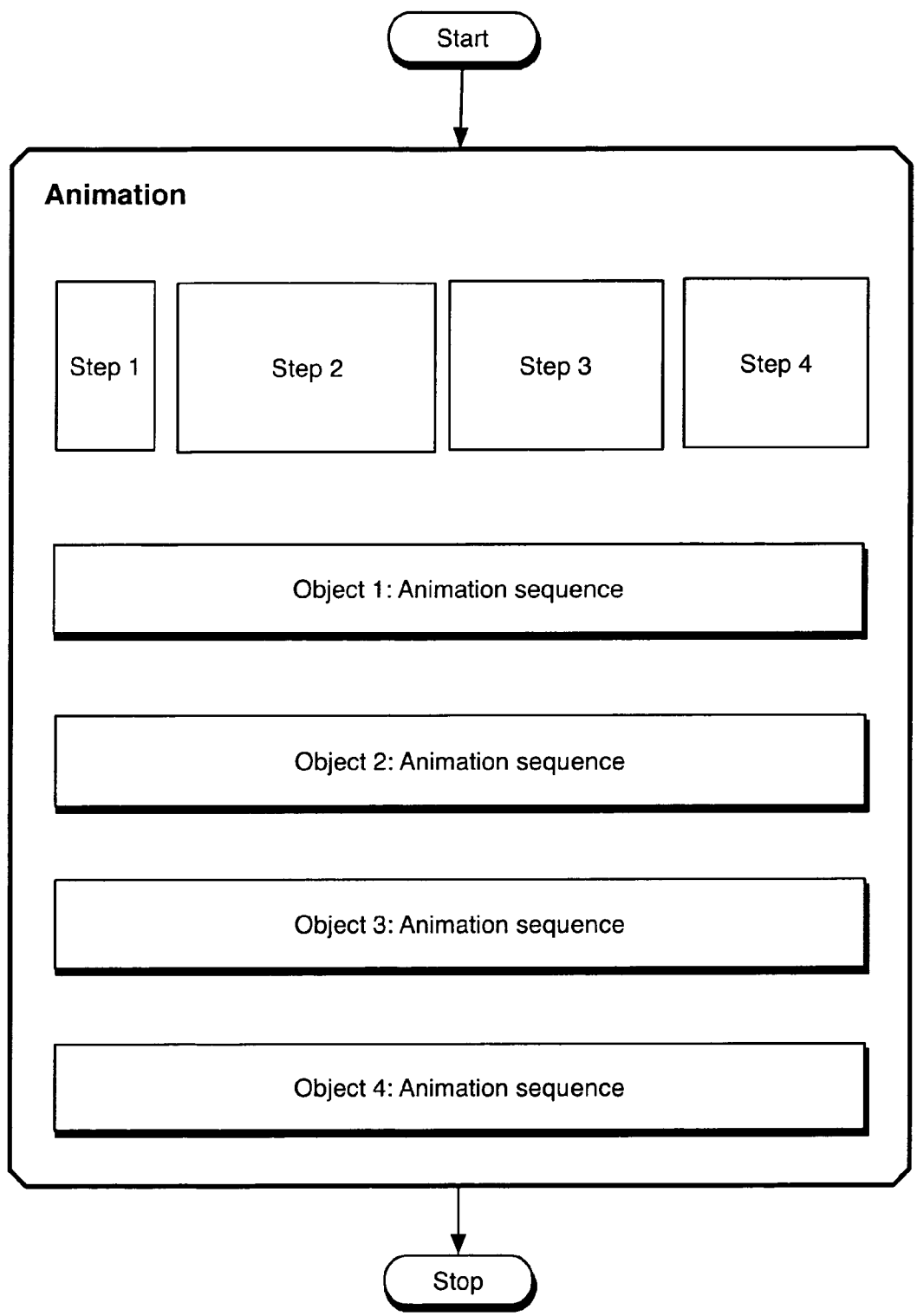
FIG. 13 is a flowchart illustrating an XML layout for a MAG[10] development in a four step project as practiced by the present invention.

FIG. 2 is a flowchart illustrating an XML layout for a prior art Viewpoint development in a four step project. FIG. 2 illustrates a prior art version which can be compared to FIG. 13 illustrating the present invention. FIG. 13 illustrates the distinct difference between the prior art and the present invention.

FIG. 2 illustrates Viewpoint's standard development. As shown in FIG. 2, there are several animation sequences for an Object. For example, Object 1 has an animation sequence in Step 1, Step 2 and Step 4. In addition, there are two animation sequences for Object 1 in the same step (Step 1 and 2). This is done in order to provide a single sequence for each step, with this, the specific sequence is executed and the animation for that particular object ends when the step ends. The additional "setup" sequence is to instantly move the objects to their initial position for a particular step.

Figure 3:
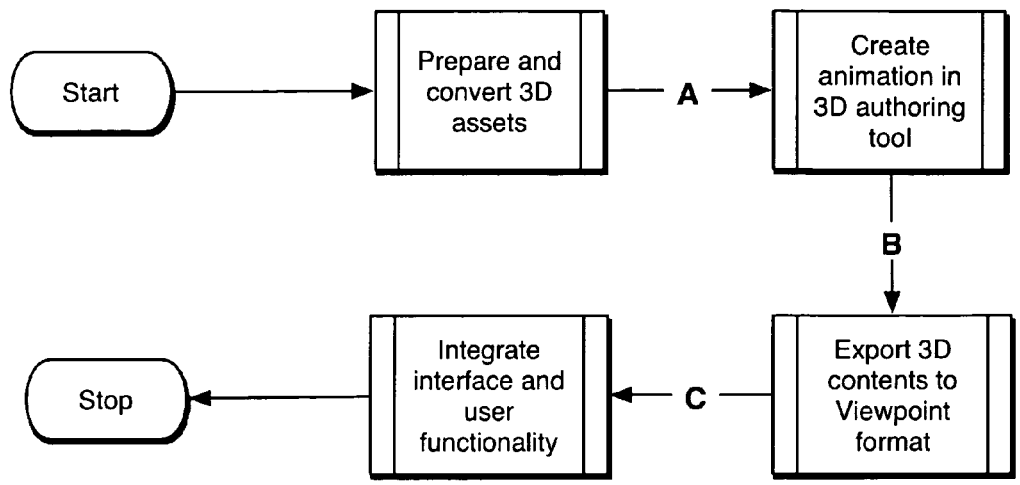
FIG. 3 is a flowchart illustrating high-level workflow for a MAG[10] animation project encompassed by the present invention.

FIG. 3 is a flowchart illustrating high-level workflow for a $MAG^{10}$ animation project encompassed by the present invention. FIG. 3 shows an overall view of a $MAG^{10}$ project, separating the process into four sections: modeling, animating, exporting and integrating the $MAG^{10}$ technology.

In the Prepare and Convert 3D Assets step, to start an animation project, models need to be acquired. Models are acquired either by modeling them from physical objects or working from existing digital files. This phase provides static/non-animated objects with color or textures.

The digital files may be in an .stl format or some other applicable format from a computer-aided design (CAD) program such as for example AutoCad or TurboCad program.

In the Create Animation in 3D Authoring Tool step after the modeling process has been completed, the animation phase begins. The animation is the implementation of movement, deformation and interaction between the different objects in the scene. To accomplish this animation phase, a 3D authoring tool, such as by way of example, LightWave, Maya, 3D Studio Max or the like, is used. For the present invention, LightWave is the tool of choice. However, one skilled in the art appreciates that other software and independent code can be used to accomplish the various phases required by the present invention.

The CAD files are converted into a 3-D format such as for example LightWave, Maya and Max. And, the 3-D format conversion creates the movement of the models.

In the Export 3D Contents to Viewpoint's Format step, the resulting animation project is in Viewpoint's format. A third party export tool is used to convert from the source files used by the 3D authoring tool to Viewpoint's format. The tool used is Right Hemisphere's Deep Exploration. Deep Exploration is a software that allows conversion between different 3D file formats. Deep Exploration is not exclusive to LightWave or Viewpoint.

In the Integrate Interface and User Functionality step, the implementation of $MAG^{10}$ technology takes place in the final phase. This is where a graphical user interface (GUI) is integrated to the animation, providing the step-by-step feature as well as other timing control features.

The first three steps illustrated in FIG. 3 may be known by those skilled in the art. However, when the first three steps are combined with the fourth step, the resulting combination is unique to the present invention. Thus, the combination as well as the fourth step alone as illustrated in FIG. 3 are unique. The implementation or integration of the unique graphical user interface (GUI) into the animation process is independently novel. Accessing files already in Viewpoint format, incorporating the interface, and incorporating the $MAG^{10}$ technology is a unique combination.

Figure 4:
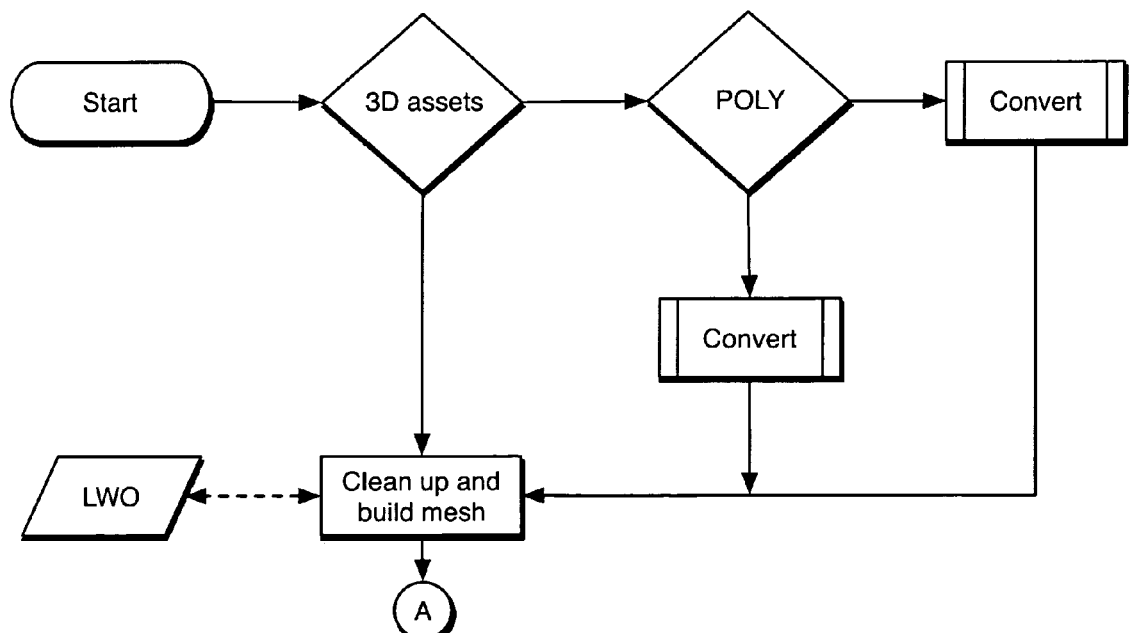
FIG. 4 is a flowchart further defining the step of preparing and converting 3D assets for a MAG[10] animation project encompassed by the present invention as illustrated in FIG. 3.
Figure 5:
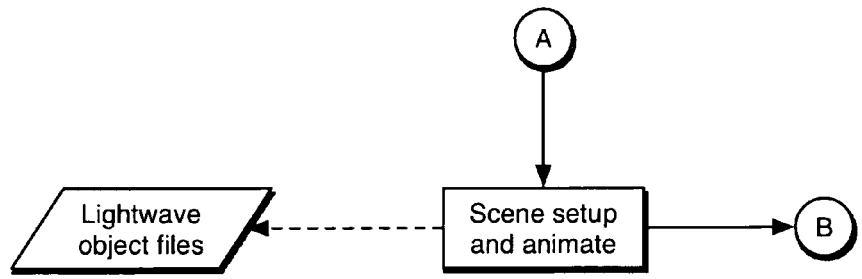
FIG. 5 is a flowchart further defining the step of creating animation in 3D authoring tool for a MAG[10] animation project encompassed by the present invention as illustrated in FIG. 3.
Figure 6:
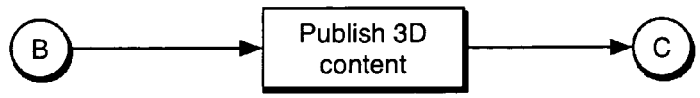
FIG. 6 is a flowchart further defining the step of exporting 3D contents for a MAG[10] animation project encompassed by the present invention as illustrated in FIG. 3.
Figure 7:
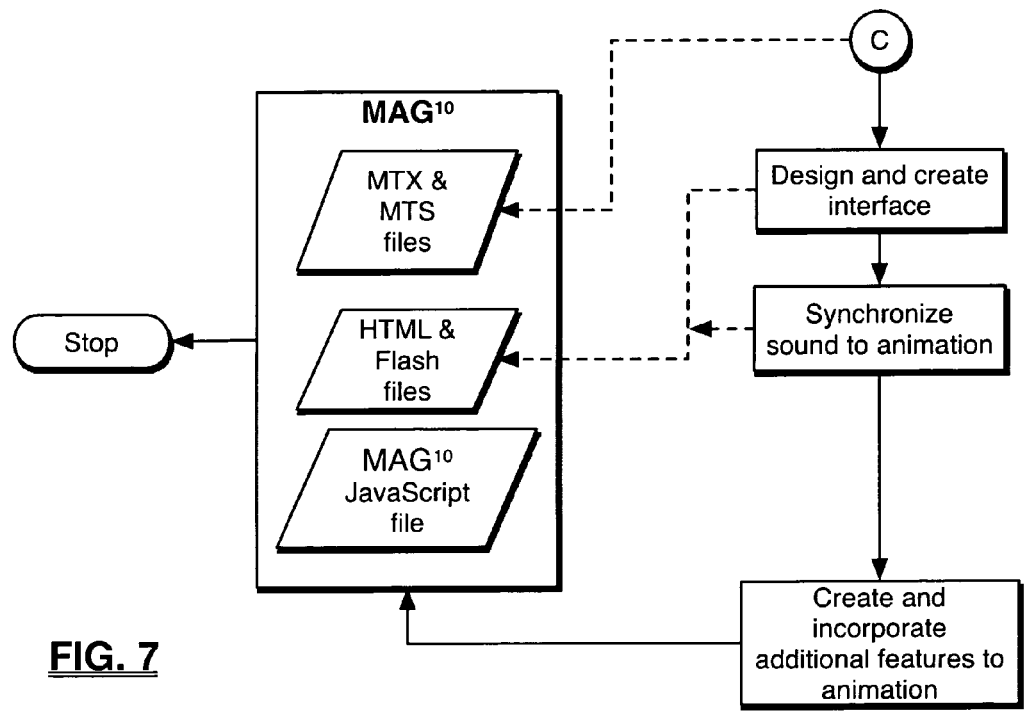
FIG. 7 is a flowchart further defining the step of integrating the interface and user functionality for a MAG[10] animation project encompassed by the present invention as illustrated in FIG. 3.

FIG. 4 is a flowchart further defining the step of preparing and converting 3D assets for a $MAG^{10}$ animation project encompassed by the present invention as illustrated in FIG. 3. FIG. 5 is a flowchart further defining the step of creating animation in 3D authoring tool for a $MAG^{10}$ animation project encompassed by the present invention as illustrated in FIG. 3. FIG. 6 is a flowchart further defining the step of exporting 3D contents for a $MAG^{10}$ animation project encompassed by the present invention as illustrated in FIG. 3. FIG. 7 is a flowchart further defining the step of integrating the interface and user functionality for a $MAG^{10}$ animation project encompassed by the present invention as illustrated in FIG. 3.

FIGS. 4, 5, 6 and 7 illustrate, in unison, a high-detail version of FIG. 3. More particularly, for the Prepare and Convert 3D Assets step illustrated in FIG. 4, the question is: Are 3D assets provided? If yes, then the assets are converted to a LightWave format. The conversion to the Lightwave format is done with Deep Exploration when the 3D assets are polygon based (CAD, STL, DXF). Alternately, the conversion to the Lightwave format is done using Rhinoceros when the 3D assets are provided as NURBS. NURBS are a mathematical representation of a 3D object, which is not supported by ViewPoint. If 3D assets are not provided, then modeling is required. The modeling may be accomplished by using 2D images or by using physical objects.

Also, in FIG. 4 for the clean up and build mesh step in LightWave, the 3D Assets are edited to a format more suitable for ViewPoint. During this task, polygon reduction and texturing take place. LightWave Object (LWO) files are outputted from the creation of the models. The LWO files are static files. And, the static LWO files are later used for animation.

In FIGS. 3 and 5, the create animation in 3D authoring tool and scene setup and animate step is illustrated. Using the LWO files, an initial layout for all objects in the scene is defined. Implementation of movement and morphing takes place during this task and a LightWave Scene (LWS) file is created. The LWS file contains the data that creates movement. The LWO files and the LWS files are required for the scene setup and animation steps of the present invention, but are not used, nor needed in the $MAG^{10}$ step of the present invention.

In FIGS. 3 and 6, the export 3D contents to viewpoint's format and publish 3D content steps are illustrated. By using Right Hemisphere's Deep Exploration, the LWS file is converted into Viewpoint's format. Right Hemisphere's Deep Exploration software converts files from one 3D format to another 3D format, such as for example, CAD files to Lightwave format. The result of this conversion is two files: a MTS file and a MTX file. The MTS file is a binary file which contains the geometry, texture and default scene information. The MTX file is an XML file with the object's positions and movement. The MTS file and the MTX file are files that are output from the publish 3D content step in FIG. 6 for use later in the methodology of the invention.

In FIGS. 3 and 7, the integrate interface and user functionality—design and create interface steps are illustrated. A customized interface or interface file is created for each project. The unique interfaces are developed using Macromedia's Flash software. The Flash software provides that the sound can be incorporated into the project. The interface file acts as a communication layer between the customized interface, which is what the user is controlling, and the animation.

To synchronize sound to animation, the interface manages the sound for each animation. It is necessary to synchronize the sound to the animation, indicating the steps and their corresponding lengths within the ActionScript portion of the Flash interface.

To create and incorporate additional features to animation, the MTX/MTS files, Flash Interface and MAG[10] Object are incorporated into a Web Page using HTML.

Figure 8:
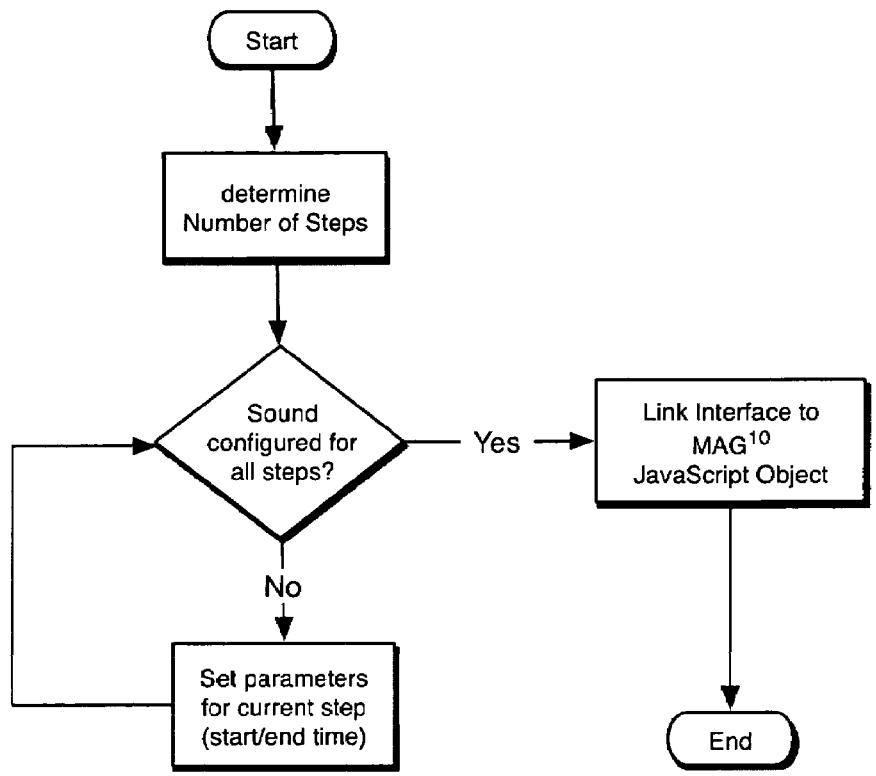
FIG. 8 is a flowchart illustrating the Flash interface development process, including the setup for each step of the animation encompassed by the present invention.

FIG. 8 is a flowchart illustrating the Flash interface development process, including the setup for each step of the animation encompassed by the present invention. This figure is focused on the synchronization of steps and does not take into account the design or implementation of the interface. Once the interface has been designed and provided with the functionality for its buttons and other GUI components, it is necessary to configure each step by providing their corresponding starting and ending times. For the starting and ending times, a determination is made of when each step starts and when each step ends. By embedding the Flash interface into the HTML, along with the JavaScript necessary for the MAG[10] objects (See, FIGS. 4, 5, 6 and 7), the Flash-JavaScript link is created. The Flash-JavaScript link provides for the communication between user and the animation. The end box in FIG. 8 is engaged with the MAG[10] box in FIG. 7.

FIG. 9 is a flowchart illustrating a high-level workflow of the MAG[10] initial setup encompassed by the present invention. In order for the MAG[10] object to establish a communication to the animation, it requires information with respect to the animation such as for example the number of steps, the animation sequence name and the starting time for each step. FIG. 9 illustrates what information is required to implement the MAG[10] object.

FIG. 10 is a flowchart illustrating a Flash Interface, a MAG[10] library object and a VMP communication encompassed by the present invention. By properly configuring the MAG[10] Library Object and the Flash Interface, all the elements of the animation project can communicate among each other. FIG. 10 illustrates the flow for an event triggered by the user. In stand-by, the interface is waiting for an instruction from the user. Once the user enters an instruction, then an event is triggered, i.e., the user pressed a button on the interface. The interface is adjacent the animation screen. Using the interface, a user can trigger an event and observe the event in the animation screen. Alternately, a user can trigger an event, decide that another event is preferred, interrupt the first triggered event, and then trigger a different second event, such that the second event is immediately engaged and displayed on the animation screen.

Figure 11:
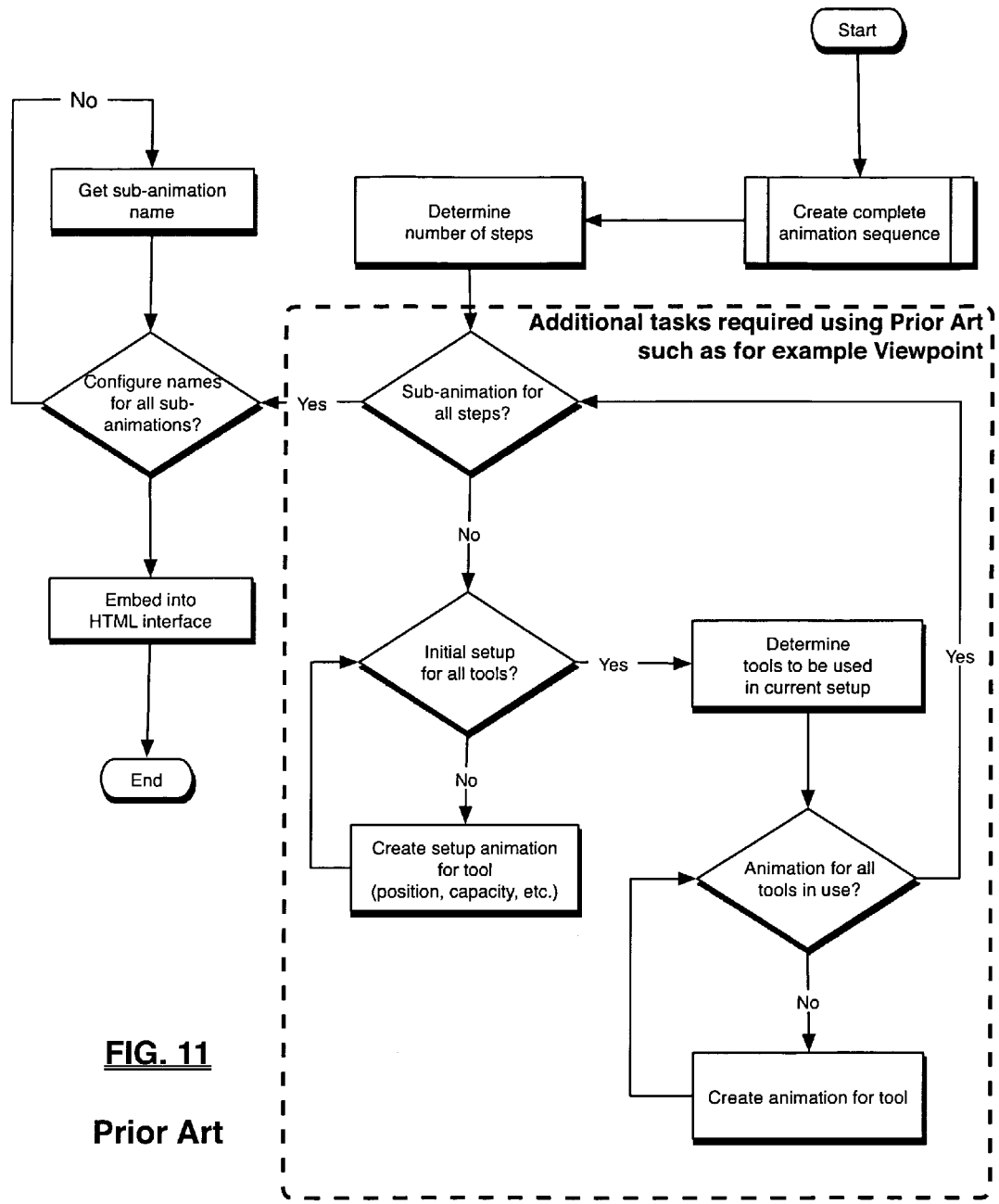
FIG. 11 is a flowchart illustrating an overview of Viewpoint's prior art approach similar to but more detailed than FIG. 1 further illustrating the sequence of tasks that differ from the tasks for practicing the present invention.

FIG. 11 is a flowchart illustrating an overview of Viewpoint's prior art approach similar to but more detailed than FIG. 1. FIG. 11 further illustrates the sequence of tasks that differ from the tasks for practicing the present invention. FIG. 11 focuses in more detail on what needs to be done after all the sub-animations have been implemented. The heavy-dashed rectangle indicates the sequence of tasks that differ from the MAG[10] development cycle.

Figure 12:
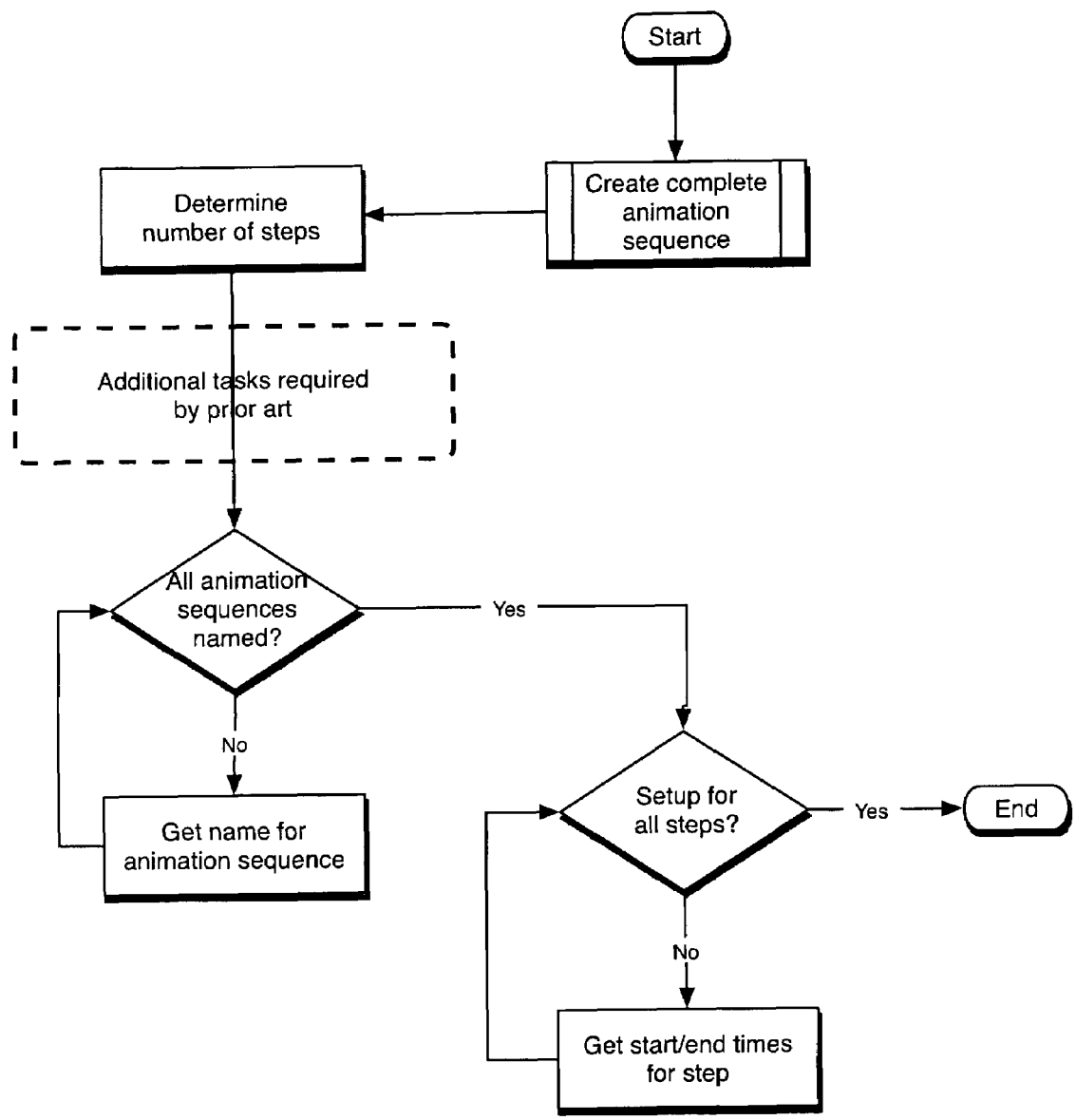
FIG. 12 is a flowchart illustrating another embodiment of a high-level workflow for a MAG[10] animation project encompassed by the present invention as illustrated in FIG. 3.

FIG. 12 is a flowchart illustrating another embodiment of a high-level workflow for a MAG[10] animation project encompassed by the present invention as illustrated in FIG. 3. The process illustrated in FIG. 12 provides for the configuration setup for the MAG[10] Object Library. It is similar to FIG. 9, but in more detail. The empty heavy-dashed rectangle indicates the location of the additional tasks that need to take place when using Viewpoint's standard development. This rectangle is highlighted in FIG. 11.

FIG. 13 is a flowchart illustrating an XML layout for a MAG[10] development in a four step project as practiced by the present invention. In the XML code (the MTX file), there is an animated sequence for an object that describes the movement of that object. By using the MAG[10] technology of the present invention, an animation sequence can be logically segmented into different steps. Such an animation is accomplished by manipulating the animation sequence, as it is, instead of creating more animation sequences for each step.

FIG. 14 is a chart illustrating a plurality of MAG[10] Library Object Class descriptions as encompassed by the present invention. This figure represents the main properties and functions of the MAG[10] Library Object.

FIG. 15 illustrates keyframe code for an object during an animation as practiced by the present invention.

FIG. 16 illustrates MAG[10] code embedded onto HTML code as practiced by the present invention.

FIG. 17 illustrates code for an initial setup configuration for one object for step one.

FIG. 18 illustrates code for an initial setup configuration for one object for step two.

FIG. 19 illustrates animation code for one object during a particular step.

Additional advantages and modification will readily occur to those skilled in the art. The invention in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. A method for controlling an animation timeline for reducing the operating load on a computer comprising the steps of:
    (a) acquiring models of the objects to be used in an animation for creating model data comprising at least one of the steps of:
        (1) modeling physical objects to create model data and
        (2) working from existing digital files to create model data, the model data for providing static/non-animated objects in operative association with the computer,
    (b) animating the models by convening the model data of the models into a 3-D format for creating movement data for defining the movement of the models by creating a layout for each object in the animation for viewing the 3-D format on the computer comprising at least one of the steps of:
        (1) implementing movement of the object and
        (2) implementing morphing of the object,
    (c) converting and exporting the animated models defined by the movement data to a format that can be accessed and viewed for creating animated model data viewable on the computer, the animated model data defines the positions and the movement of each object within an object animation sequence for the particular object as viewed on the computer, the object animation sequence for each particular object describes the movement of that object such that the object animation sequence can be readily segmented into different steps by manipulating the object animation sequence on the computer, as it is, instead of creating more animation sequences for each step,
    (d) integrating the animated model data with a graphical user interface (GUI) on the computer using a library such that only one object animation sequence is required for each object in the object animation sequence and the one object animation sequence contains all the information for the entire animation associated with each object, the library acts as a medium for establishing communication between the graphical user interface (GUI), the computer and the animated model data for defining the animation timeline for manipulation and viewing on the computer.

(e) implementing the control of the animation timeline by an end user on the computer such that the animation comprises at least one step, and each step comprises at least one portion of the object animation sequence associated specifically with the object defined in the object animation sequence whereby the animation comprises at least one step and the step comprises at least one portion of the object animation sequence associated with each object displayed in the animation on the computer, (f) engaging the graphical user interface (GUI) on the computer to trigger an animation comprising one or more objects for observing the animated object and, alternately, triggering a first animation, before the end of the first animation, triggering a second animation which interrupts the first triggered animation, such that the second animation is immediately engaged and displayed on the compute, such that controlling the animation timeline uses the single object animation sequence associated with each object, for all objects, used in the animation, and the object animation sequence contains the positions and the movement of each object used in the animation whereby each animation comprises at least one step, and each step comprises at least one object animation sequence, and each object animation sequence defines the positions and the movement of each object in the animation as viewed on the computer thereby enhancing the interactivity with the animation on the computer.

2. The method for controlling an animation timeline for reducing the operating load on a computer as defined in claim 1 wherein the step of integrating the animated model data with a graphical user interface (GUI) on the computer using a library further comprises the steps of:
  (a) implementing a timeline,
  (b) engaging a target,
  (c) changing a property of the target, and
  (d) implementing a set of values.

3. The method for controlling an animation timeline for reducing the operating load on a computer as defined in claim 2 wherein the step of implementing a timeline comprises the step of implementing a set of time frames where a value is changed on the specified property.

4. The method for controlling an animation timeline for reducing the operating load on a computer as defined in claim 2 wherein the step of engaging a target comprises the step of engaging the object which is going to be affected.

5. The method for controlling an animation timeline for reducing the operating load on a computer as defined in claim 2 wherein the step of implementing a set of values comprises the step of implementing each value corresponding to one time frame in the timeline the composition of frames for viewing on the computer.

6. The method for controlling an animation timeline for reducing the operating load on a computer as defined in claim 1 wherein the step of converting and exporting the animated models defined by the movement data to a format that can be accessed and viewed on the computer for creating animated model data comprises the step of convening and exporting the animated models to a Viewpoint Media Player format for viewing on the computer.

7. A method for controlling an animation timeline mag01 comprising the steps of:
  (a) acquiring models of the objects to be used in an animation for creating model data comprising at least one of the steps of:
    (1) modeling physical objects to create model data and
    (2) working from existing digital files to create model data, the model data for providing static/non-animated objects for viewing on the computer,
  (b) animating the models by converting the model data of the models into a 3-D format for creating movement data for defining the movement of the models by creating a layout for each object in the animation for viewing the 3-D format on the computer comprising at least one of the steps of:
    (1) implementing movement of the object and
    (2) implementing morphing of the object,
  (c) convening and exporting the animated models defined by the movement data to a format that can be accessed and viewed for creating animated model data using Viewpoint Media Player in association with the computer, the animated model data defines the positions and the movement of each object within an object animation sequence for the particular object as viewed on the computer, the object animation sequence for each particular object describes the movement of that object as viewed on the computer such that the object animation sequence can be readily segmented into different steps by manipulating the object animation sequence, as it is, instead of creating more animation sequences for each step,
  (d) integrating the animated model data with a graphical user interface (GUI) on the computer using a library such that only one object animation sequence is required for each object in the object animation sequence and the one object animation sequence contains all the information for the entire animation associated with each object the library acts as a medium for establishing communication between the graphical user interface (GUI) and the animated model data for defining the animation timeline for manipulation and viewing on the computer, wherein using the library comprises the steps of:
    (1) implementing the timeline comprises the step of implementing a set of time frames where a value is changed on the specified property,
    (2) engaging a target comprises the step of engaging the object which is going to be affected,
    (3) changing a property of the target, and
    (4) implementing a set of values comprises the step of implementing each value corresponding to one time frame in the timeline,
  (e) implementing the control of the animation timeline by an end user on the computer such that the animation comprises at least one step, and each step comprises at least one portion of the object animation sequence associated specifically with the object defined in the object animation sequence whereby the animation comprises at least one step and the step comprises at least one portion of the object animation sequence associated with each object displayed in the animation on the computer,
  (f) engaging the graphical user interface (GUI) on the computer to trigger an animation comprising one or more objects for observing the animated object and, alternately, triggering a first animation, before the end of the first animation, triggering a second animation which interrupts the first triggered animation, such that the second animation is immediately engaged and displayed on the computer, such that controlling the animation timeline uses the single object animation sequence associated with each object, for all objects, used in the animation, and the object animation sequence contains the positions and the movement of each object used in the animation whereby each animation comprises at least one step, and each step comprises at least one object animation sequence, and each object animation sequence defines the positions and the movement of each object in the animation as viewed on the computer thereby enhancing the interactivity with an animation on the computer.

8. A method for controlling an animation timeline on a computer comprising the steps of:

(a) acquiring models of the objects to be used in an animation for creating model data, the model data for providing static/non animated objects, (b) animating the models by converting the model data of the models into a 3-D format for creating movement data for defining the movement of the models by creating a layout for each object in the animation compatible with the computer, (c) converting and exporting the animated models defined by the movement data to a format that can be accessed and viewed for creating animated model data using Viewpoint Media Player in association with the computer, the animated model data defines the positions and the movement of each object within an object animation sequence for the particular object, the object animation sequence for each particular object describes the movement of that object in association with the computer such that the object animation sequence can be readily segmented into different steps by manipulating the object animation sequence for viewing on the computer, as it is, instead of creating more animation sequences for each step, (d) integrating the animated model data with a graphical user interface (GUI) of the computer using a library such that only one object animation sequence is required for each object in the object animation sequence and the one object animation sequence contains all the information for the entire animation associated with each object, the library acts as a medium for establishing communication between the graphical user interface (GUI), the computer and the animated model data for defining the animation timeline, (e) implementing the control of the animation timeline by an end user such that the animation comprises at least one step, and each step comprises at least one portion of the object animation sequence associated specifically with the object defined in the object animation sequence whereby the animation comprises at least one step and the step comprises at least one portion of the object animation sequence associated with each object displayed in the animation on the computer, and (f) engaging the graphical user interface (GUI) on the computer to trigger an animation comprising one or more objects for observing the animated object on the computer and, alternately, triggering a first animation, before the end of the first animation, triggering a second animation which interrupts the first triggered animation, such that the second animation is immediately engaged and displayed on the computer, such that controlling the animation timeline uses the single object animation sequence associated with each object, for all objects, used in the animation, and the object animation sequence contains the positions and the movement of each object used in the animation whereby each animation comprises at least one step, and each step comprises at least one object animation sequence, and each object animation sequence defines the positions and the movement of each object in the animation on the computer thereby enhancing the interactivity with an animation.

9. The method for controlling an animation timeline on a computer as defined in claim 8 wherein the step of using the library comprises the steps of:

(a) implementing the timeline comprises the step of implementing a set of time frames where a value is changed on the specified property, (b) engaging a target comprises the step of engaging the object which is going to be affected, (c) changing a property of the target, and (d) implementing a set of values comprises the step of implementing each value corresponding to one time frame in the timeline.

10. The method for controlling an animation timeline on a computer as defined in claim 8 wherein the step of acquiring models of the objects to be used in an animation for creating model data comprising at least one of the steps of:

(a) modeling physical objects to create model data, and (b) working from existing digital flies to create model data, the model data for providing static/non-animated objects for viewing on the computer.

11. The method for controlling an animation timeline on a computer as defined in claim 8 wherein the step of animating the models by converting the model data of the models into a 3-D format for creating movement data for defining the movement of the models by creating a layout for each object in the animation comprising at least one of the steps of:

(a) implementing movement of the object and (b) implementing morphing of the object.

* * * * *